United States Patent [19]
Rogers

[11] 3,900,833
[45] Aug. 19, 1975

[54] DATA COMMUNICATION SYSTEM

[75] Inventor: R. Timothy Rogers, Wayne, N.J.

[73] Assignee: The Singer Company, Little Falls, N.J.

[22] Filed: Mar. 18, 1974

[21] Appl. No.: 451,974

[52] U.S. Cl. .......... 340/147 C
[51] Int. Cl.² .......... H04Q 9/00
[58] Field of Search .......... 340/147 R, 147 C, 167 R, 340/166 R, 151

[56] References Cited

UNITED STATES PATENTS

| | | | |
|---|---|---|---|
| 3,601,807 | 8/1971 | Beausodeil | 340/147 C |
| 3,633,168 | 1/1972 | Dixon et al. | 340/167 R |
| 3,694,580 | 9/1972 | Inose et al. | 340/166 R |
| 3,731,275 | 5/1973 | Lenk et al. | 340/166 R |
| 3,818,447 | 6/1974 | Craft | 340/147 LP |

OTHER PUBLICATIONS

J. G. Brenza, "Data Acquisition and Distribution System," IBM Tech. Disc. Bulletin, Vol. 13, No. 9, Feb. 1971, p. 2523, 2524.

*Primary Examiner*—Donald J. Yusko
*Attorney, Agent, or Firm*—T. W. Kennedy

[57] ABSTRACT

A digital data communication system is provided which includes a subsystem having a multiplicity of encoder/decoder interface modules which may be cross-connected to permit redundant interconnection of portions of the modules to allow two or more such portions to be paralleled to constitute a high reliability system. The individual modules, in accordance with the invention, are constructed to be micro programmable by means of a read-only memory which enables received control words to be divided into their individual sections, or fields, and which permits the individual fields to be separately steered into designated logical elements connected in parallel between a common receive bus and a common transmit bus. The system is capable of processing a wide variety of word formats, and any designated word sections, regardless of bit lengths, within the capabilities of the individual logic elements.

10 Claims, 3 Drawing Figures

PATENTED AUG 19 1975 3,900,833

SHEET 1 OF 3

DATA COMMUNICATION SYSTEM

BACKGROUND OF THE INVENTION

It is common practice in the present state of the digital data processing art to transmit and receive digital data on a common communication link between a multiplicity of subsystems, computers, remote terminals, sensors or output devices, and the like. Copending application Ser. No. 425,802 filed Mar. 20, 1974, now allowed for example, describes and claims a unique decoding system for use in a binary phase modulated digital transmission system. As pointed out in the copending application, binary phase modulation has become a major modulation method in recent years for the transmission of digital data.

The data communication system in which the module of the present invention is incorporated may be of the binary phase modulation type, and the module may include a decoder of the type disclosed in the copending application. In one of its aspects, the invention provides an improved interface module that can be used by a subsystem, computer, remote terminal, sensor or output device to receive and/or transmit data on a common data communication link.

In its receive mode, the module of the invention accepts and decodes control words and data words of the received digital signals. In its transmit mode, data words, or response words, are received by the module from the associated subsystem, or other device, and are encoded and transmitted over the data link. A mode field in the control words received by the module determines the receive or transmit mode of the particular module.

The interface module of the invention is constructed to be micro programmable by means of a read-only memory to enable the control words to be divided into their individual fields, or sections, and to cause the individual sections to be steered into separate designated registers, whose inputs are connected in parallel to a common receive bus, so that the system is neither format dependent nor bit limited.

As will be described, the interface module of the invention is constructed to permit redundant interconnection of its components of like modules to allow a multiplicity of such modules to be parallel for high reliability.

DETAILED DESCRIPTION OF THE ILLUSTRATED EMBODIMENT

Figure 1:
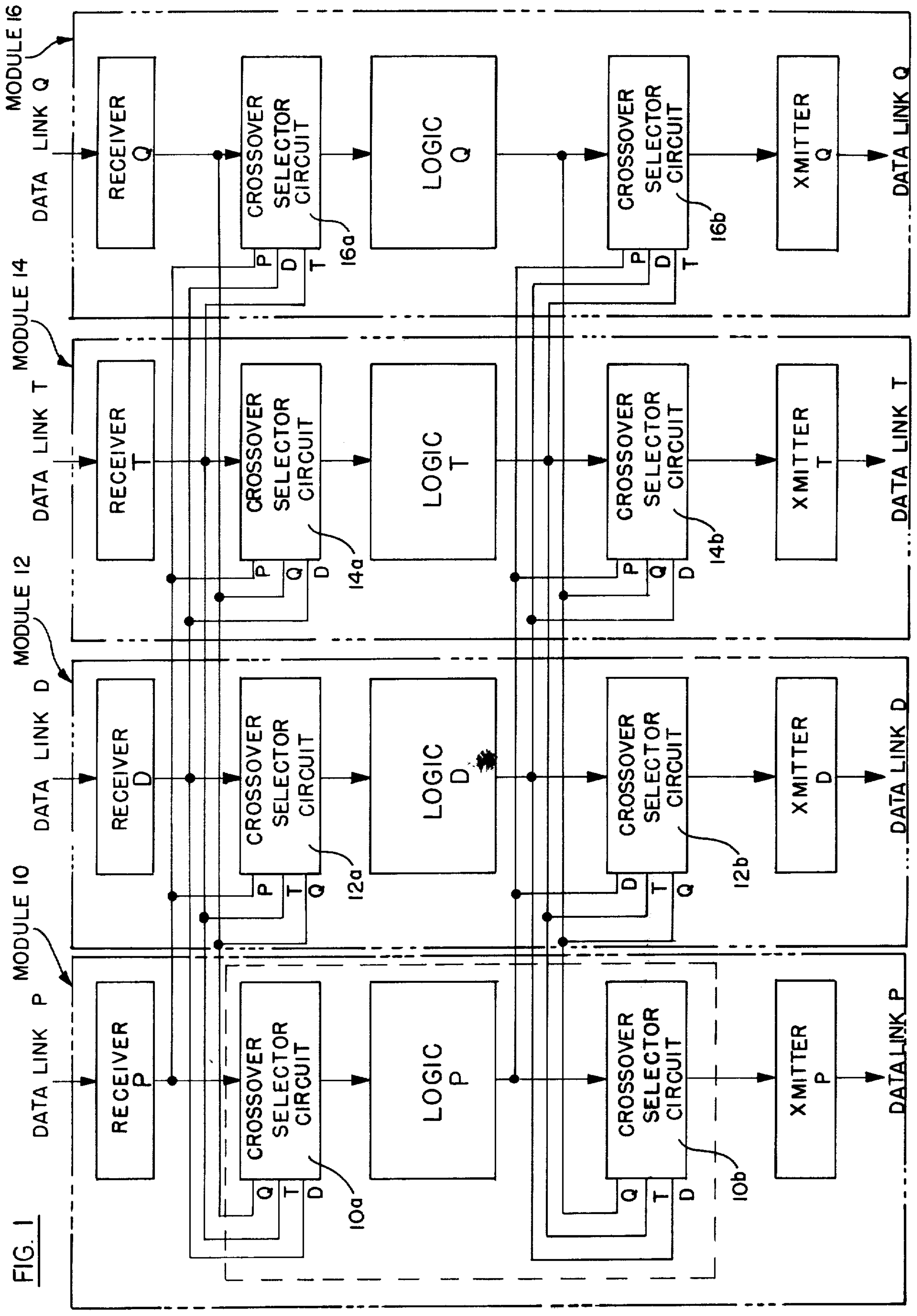
FIG. 1 is a block diagram showing a plurality of interface modules, each incorporating the concepts of the invention, and cross-connected to permit the module to be paralleled for high reliability.

The representation of FIG. 1 includes four modules designated 10, 12, 14 and 16, each of which may be constructed in accordance with the concepts of the invention. As illustrated, the module 10 includes a receiver P which is connected through a crossover selector circuit 10*a*, to a logic circuit designated "logic P." The output of the logic circuit is connected through a crossover selector circuit 10*b* to a transmitter P. The receiver P receives digital data over a common communication link designated data link P, and the transmitter P transmits digital data over the common communication link designated data link P.

The module 12 includes a receiver D which receives digital data over a common data link D, and which is coupled through a crossover selector circuit 12*a* to a logic circuit designated "logic D." The output of the logic circuit is coupled through a crossover selector circuit 12*b* to a transmitter D. The transmitter D transmits information over the data link D.

In like manner, a module 14 includes a receiver T which receives data over a common communication link T, and which is coupled through a crossover selector circuit 14*a* to a logic circuit designated "logic T." The output of the logic circuit is coupled through a crossover selector circuit 14*b* to a transmitter T, and the transmitter transmits data over the common link T. The module 16 includes a receiver Q which receives digital data over a common data link Q, and which is coupled through a cross-over selector circuit 16*a* to a logic circuit designated "logic Q." The output of the latter logic circuit is coupled through a cross-over selector circuit 16*b* to a transmitter Q, and the transmitter transmits data over the common data link Q.

Figure 2:
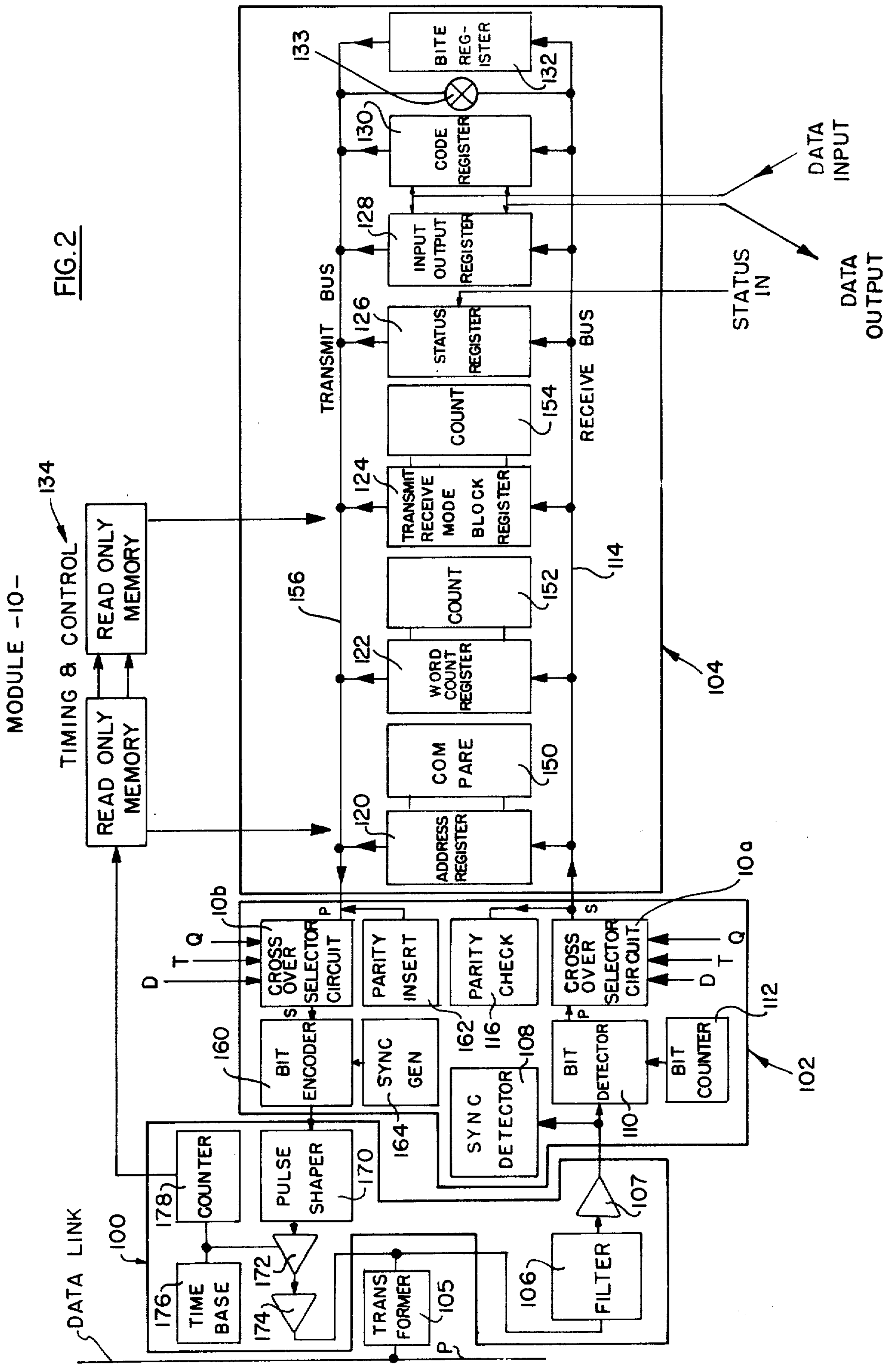
FIG. 2 is a logic block diagram of an interface module incorporating the concepts of the invention.

Each of the modules of FIG. 1 may be constructed in the manner shown in FIG. 2, and each is capable of receiving and transmitting data over its corresponding common communication link. The modules are so constructed, that the individual logic elements may be cross-connected by the corresponding crossover selector circuits, so that as many modules as desired may be paralleled for high reliability.

In the system of FIG. 1, for example, should the receiver P fail, the crossover selector circuit 10*a* may connect the logic P to any of the other receivers. Likewise, should the logic P fail, the crossover selector circuit 12 of A may connect the receiver P to the logic D. Likewise, should the transmitter P fail, for example, the crossover selector circuit 10*b* may connect the output of the logic P through the crossover selector circuit 12 to the transmitter D, or through the other crossover selector circuits to any of the other transmitters. Should the logic P fail, for example, the crossover selector circuit 10*a* may connect the received information from the receiver P to any of the other logic circuits for processing.

The individual interface module 10, as shown in FIG. 2, for example, may be formed on three integrated circuit sections designated 100, 102 and 104. The circuit of the section 100 is coupled to the common data link P through a transformer 105 to receive the digital data from the link, and to transmit digital data over the link.

The section 100 includes a receiver circuit which, in turn, includes a filter 106 and an amplifier 107 which receives, for example, binary phase modulated digital data which is introduced to the section 102. The section 102 includes, for example, a synchronizing signal detector 108, a bit detector 110 and a bit counter 112, all of which cooperate in the manner described in the aforesaid copending application to decode the received digital data and to recover the digital words, which may have the format shown in FIG. 3. The section 102 may also include a parity check circuit 116 for checking parity bits, in a manner well understood by the art. The output of the bit detector 110 is passed through the crossover selector 10*a* to a common receive bus 114 in the section 104.

The blocks 108, 110 and 112 of the circuitry in section 102 form a decoder, which may be similar to the decoder described in the copending application, so that the decoded words may be introduced into the receive bus 114. The section 104 includes a plurality of logic elements, such as an address register 120 which receives the address section of the message control word (MCW) (FIG. 3); a word count register 122 which receives the word count section of the message control word; a transmit/receive mode block register 124 which receives the T/R bit of the message control word; a status register 126; an input/output register 128 which receives the data words (FIG. 2); a code register 130; a bit block 132; and a switch 133. The inputs of these logic elements are all connected in parallel to the receive bus 114. A read-only memory 134 is provided which controls the logic circuitry of the section 104, and which is properly timed so that the various sections, or fields, of the received control words may be separately steered into the individual logic elements 120, 122, 124, 126, and so that the received data words may be steered into the input/output register 128.

As shown, the address register 120 is connected to an appropriate compare network 150 in which the designated address of the particular sub-system is set, so that only messages intended for the particular sub-system are accepted. The word count register 122 is connected to a counter 152 so that the designated word count in the word section of the message control word may set the sub-system to accept, or transmit, a predetermined number of ensuing data words. The mode block 124 is connected to a counter 154, so that the associate system may be set to a receive mode or a transmit mode.

If the interface module 10 is set to its receive mode, a subsequently received data word is steered into the input/output register 128 to be subsequently introduced into the associated system. If the module is set to its transmit mode, on the other hand, the data word from the associated system is introduced to the input/output register 128 for subsequent transmission on the data link P. The code register and the bite register are used for checking and test purposes in accordance with accepted practice. The switch 133 permits any data in any of the registers to be directly recirculated for test or other purposes.

The outputs of the various logical elements 120, 122, 124, 126, 128, 130 and 132 are connected to a common transmit bus 156 which, in turn, is coupled through the crossover selector circuit 10*b* to a bit encoder 160 in the section 102, for encoding the transmitted signal, as also explained in the copending application. The section also includes a parity insert network 162 and a synchronizing signal generator 164, for inserting parity bits and synchronizing signals into the transmitted signal. The signals from the encoder then pass to the transmitter section of the element 100, which includes a pulse shaper 170, the output of which is passed through appropriate amplifiers 172 and 174 to the transformer 105. A time base generator circuit 176 is also included in the section 100. The time base circuit 176 is connected to a counter 178 which controls the read-out memory 134.

Figure 3:
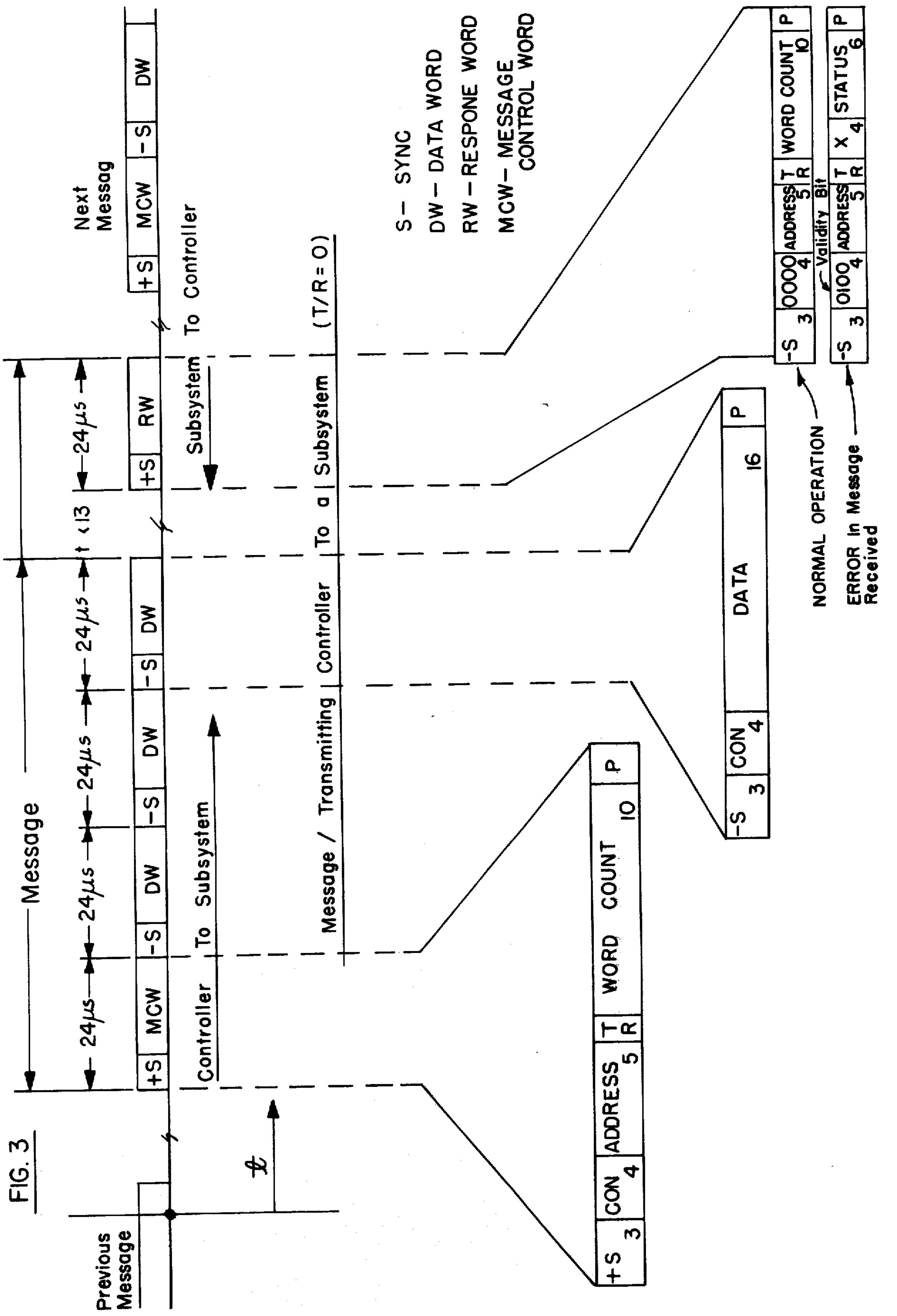
FIG. 3 is a schematic representation of a typical control and data word structure in a digital communication system.

At the beginning of a transmission of a particular message from a transmitting controller to a subsystem, as shown in FIG. 3, for example, the message is preceded by a message control word (MCW) which is followed by a series of data words (DW). As fully explained in the copending application, each message control word is preceded by a positive synchronizing signal (+S), and each data word is preceded by a negative synchronizing signal (−S).

When a message is first received by the subsystem, the time base 176 is activated to cause the counter 178 to control the read-only memory 130, so that the read-only memory will issue a series of instructions to the logic circuitry of the section 104 in the proper sequence, and properly timed. These instructions cause the individual sections, or fields, of the message control word to be separately steered into the various logic elements in the element 104. For example, the address field of the message control word is steered into the address register 120, the word count field is steered into the word register 122, the P/R mode bit is steered into the mode block 124, and the control field is steered into the status register 126.

The received control word conditions the associated system to receive or transmit successive data words. For example, for a particular state of the T/R field of the control word, the system is set to the receive mode, and the data words subsequently received over the data link P are successively steered into the input/output register 128 for introduction into the associate subsystem. On the other hand, should the mode bit be set to the other binary state, a transmit mode is indicated to the module, so that data from the associated system is successively introduced into the input/output register 128 for introduction to the encoder of the module by way of the common transmit bus 156.

At the end of any message transmitted from the controller to the subsystem associated with the interface module of FIG. 2, a response word (RW) may be steered into the input/output register 128 for transmission to the controller, the format of which is shown in FIG. 3. A similar interface module at the controller may then steer the various components of the response word into corresponding logic elements, such as those shown in FIG. 2.

The invention provides, therefore, an improved interface module which is constructed so that it can conveniently be cross-connected with other like interface modules for increased reliability. The module of the invention, as described above, has the ability to accept and decode control words and data words, and to transfer the decoded control words and data words to the associated system. The interface module has the feature in that the various sections, or fields, of the received control words are steered individually into separate logical elements, so that the module may be made to operate for wide ranges in data rate, word length, message sequences, mode variations, and system configuration. As also described, the interface module can bet set to either a receive mode or a transmit mode.

While a particular embodiment of the invention has been shown and described, modifications may be made. It is intended in the following claims to cover the modifications which come within the spirit and scope of the invention.

What is claimed is:

1. In a digital data transmission system, an interface module for coupling a subsystem, or the like, to a common communication link and which includes:

a receiving section having a decoder for accepting and detecting multi-section control words and data words;
a common bus connected to said decoder in said receiving section for receiving detected control words and data words from the decoder;
a plurality of logic elements having inputs parallel coupled to said common bus; and
logic circuitry connected to said logic elements for steering the individual sections of the control word into different ones of said logic elements.

2. The combination defined in claim 1, and which includes register means coupled to said common bus, and in which said logic circuitry steers received data words into said register means.

3. The combination defined in claim 1, and which includes read-only memory means included in said logic circuitry to program said logic circuitry to any particular format of the received control words and to permit the individual sections of the received control words to be steered by said logic circuitry into predetermined different ones of said logic elements.

4. The combination defined in claim 2, and which includes read-only memory means to program said logic circuitry to any particular format of the received control words and data words, and to permit the individual sections of the received control words to be steered by said logic circuitry into predetermined different ones of said logic elements and to permit said data words to be steered into said register means.

5. The combination defined in claim 1, and which includes a transmitting section having an encoder; a second common bus connected to the encoder in said transmitting section and to which the outputs of said logic elements are parallel coupled; and in which said logic circuitry is controllable to select signals from different ones of said logic elements in a controllable sequence for application to said encoder by said second common bus.

6. The combination defined in claim 5, and which includes read-only memory means included in said logic circuitry to program said logic circuitry to any particular format of the sequence in which signals from said logic elements are to be supplied to said encoder.

7. The combination defined in claim 6, in which said read-only memory means also serves to program said logic circuitry to any particular format of the received control words and data words, and to divide the received control words into individual sections to be steered by said logic circuitry into predetermined different ones of said logic elements.

8. The combination defined in claim 7, and which includes register means having its input connected to the first-named common bus and its output connected to the second common bus, and in which said read-only memory means programs the logic circuitry to steer received data words into said register means during a receive mode of the module, and to steer data words out of said register means to the second common bus for application to said decoder during a transmit mode of the module.

9. The combination defined in claim 8, in which said logic elements include a mode block, and in which the received control words include a mode-designating section to be steered by said logic circuitry into said mode block to determine the transmit/receive mode of the module.

10. The combination defined in claim 5, and which includes a plurality of like modules each connected to a different data link; and crossover circuitry to permit the encoder and decoder and associated logic elements of each of said modules to be redundantly interconnected to allow for said modules to be paralleled for high reliability.

* * * * *